US008904113B2

(12) United States Patent
Chen et al.

(10) Patent No.: US 8,904,113 B2
(45) Date of Patent: Dec. 2, 2014

(54) VIRTUAL MACHINE EXCLUSIVE CACHING

(75) Inventors: Han Chen, White Plains, NY (US); Hui Lei, New York, NY (US); Zhe Zhang, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 195 days.

(21) Appl. No.: 13/479,664

(22) Filed: May 24, 2012

(65) Prior Publication Data

US 2013/0318301 A1 Nov. 28, 2013

(51) Int. Cl.
*G06F 12/08* (2006.01)

(52) U.S. Cl.
USPC ............ 711/129; 711/E12.039; 711/E12.046; 718/104

(58) Field of Classification Search
USPC .......... 711/118, 126, 129, E12.021, E12.025, 711/E12.039, E12.046; 718/104
See application file for complete search history.

(56) References Cited

U.S. PATENT DOCUMENTS

| | | | |
|---|---|---|---|
| 6,789,156 B1 | 9/2004 | Waldspurger | |
| 7,761,664 B2 | 7/2010 | Gill | |
| 8,055,845 B2 | 11/2011 | Soules et al. | |
| 8,095,931 B1 | 1/2012 | Chen et al. | |
| 8,156,301 B1 | 4/2012 | Khandelwal et al. | |
| 8,161,243 B1 | 4/2012 | Wagh et al. | |
| 8,166,265 B1 | 4/2012 | Feathergill | |
| 2005/0223005 A1 | 10/2005 | Shultz et al. | |
| 2008/0059769 A1 | 3/2008 | Rymarczyk et al. | |
| 2008/0307188 A1 | 12/2008 | Franaszek et al. | |
| 2009/0217021 A1* | 8/2009 | Goodson et al. | 713/1 |
| 2009/0328074 A1 | 12/2009 | Oshins | |
| 2010/0299673 A1 | 11/2010 | Shultz et al. | |
| 2011/0145199 A1 | 6/2011 | Prasad | |
| 2011/0246984 A1 | 10/2011 | Sharp et al. | |
| 2011/0271079 A1 | 11/2011 | Rymarczyk et al. | |
| 2011/0296407 A1* | 12/2011 | Bhandari et al. | 718/1 |
| 2012/0072388 A1* | 3/2012 | Ueda | 706/52 |
| 2013/0054895 A1* | 2/2013 | Tuch et al. | 711/118 |
| 2013/0060946 A1* | 3/2013 | Kenneth et al. | 709/226 |
| 2013/0086579 A1* | 4/2013 | Venkat et al. | 718/1 |

OTHER PUBLICATIONS

Lu et al., Virtual Machine Memory Access Tracing with Hypervisor Exclusive Cache. 2007 USENIX Annual Technical Conference, 29-43.
Yinqian et al., HomeAlone: Co-Residency Detection in the Cloud via Side-Channel Analysis, 2011 IEEE Symposium on Security and Privacy (SP), 313-328.
Bakoglu et al., Second-Level Shared Cache Implementation for Multiprocessor Computers with a Common Interface for the Second-Level Shared Cache and the Second-Level Private Cache, Apr. 1, 1991.
Amazon Elastic Compute Cloud, (ec2), http://aws.amazon.com/ec2/, downloaded May 24, 2012, pp. 1-11.

(Continued)

*Primary Examiner* — Hal Schnee
(74) *Attorney, Agent, or Firm* — Ryan, Mason & Lewis, LLP

(57) ABSTRACT

Techniques, systems and an article of manufacture for caching in a virtualized computing environment. A method includes enforcing a host page cache on a host physical machine to store only base image data, and enforcing each of at least one guest page cache on a corresponding guest virtual machine to store only data generated by the guest virtual machine after the guest virtual machine is launched, wherein each guest virtual machine is implemented on the host physical machine.

20 Claims, 3 Drawing Sheets

(56) References Cited

OTHER PUBLICATIONS

Apache Hadoop Project, http://hadoop.apache.org/common/ 2007, pp. 1-2.

Frasca et al., Virtual i/o Caching: Dynamic Storage Cache Management for Concurrent Workloads, in Proceedings of 2011 International Conference for High Performance Computing, Networking, Storage and Analysis (New York, NY, USA, 2011), SC'1 1, ACM, pp. 38:1-38:11.

Hines et al., Applications Know Best: Performance-Driven Memory Overcommit with Ginkgo, in Proceedings of the 3rd IEEE International Conference on Cloud Computing Technology and Science (2011), CloudCom'11.

IBM Smart Cloud Enterprise (sce), http://www-935.ibm.com/services/us/en/cloud-enterprise downloaded May 24, 2012, pp. 1-2.

Jayaram et al., An Empirical Analysis of Similarity in Virtual Machine Images, In Proceedings of the Middleware 2011 Industry Track Workshop (New York, NY, USA, 2011), Middleware '11, ACM, pp. 6:1-6:6.

Jones et al., Geiger: Monitoring the Buffer Cache in a Virtual Machine Environment, in Proceedings of the 12th International Conference on Architectural Support for Programming Languages and Operating Systems (New York, NY, USA, 2006), ASPLOSXII, ACM, pp. 14-24.

Kim et al., Xhive: Efficient Cooperative Caching for Virtual Machines, IEEE Trans. Comput. 60 (Jan. 2011), 106-119.

Koller et al., I/o Deduplication: Utilizing Content Similarity to Improve i/o Performance, Trans. Storage 6 (Sep. 2010), 13:1-13:26.

Kvm Best Practices for Over-Committing Processor and Memory Resources, http://publib.boulder.ibm.com/infocenter/lnxinfo/v3r0m0/index.jsp?topic=%2Fliaat%Fliaatbpmemovercommit.htm, downloaded May 14, 2012, pp. 1.

Magenheimer et al., Paravirtualized Paging, in Proceedings of the First Conference on I/O Virtualization (Berkeley, CA, USA, 2008), WIOV'08, USENIX Association, pp. 6-6.

Mann et al., Handling OS Jitter on Multicore Multithreaded Systems, in Proceedings of the 2009 IEEE International Symposium on Parallel&Distributed Processing (Washington, DC, USA, 2009), IPDPS '09, IEEE Computer Society, pp. 1-12.

Milos et al., Satori: Enlightened Page Sharing, in Proceedings of the 2009 Conference on USENIX Annual Technical Conference (Berkeley, CA, USA, 2009), USENIX'09, USENIX Association, pp. 1-1.

Ousterhout et al., The Case for Ramclouds: Scalable High-Performance Storage Entirely in Dram, SIGOPS Oper. Syst. Rev. 43 (Jan. 2010), 92-105.

Virtio, Qemu Virtio Driver, http://www.linux-kvm.org/page/Virtio dowloaded May 24, 2012, pp. 1-2.

Rowstron et al., Pastry: Scalable, Decentralized Object Location, and Routing for Large-Scale Peer-to-Peer System, In Proceedings of the IFIP/ACM International Conference on Distributed Systems Platforms Heidelberg (London, UK, 2001), Middleware '01, Springer-Verlag, pp. 329-350.

Waldspurger, Memory Resource Management in VMware ESX Server, SIGOPS Oper. Syst. Rev. 36 (Dec. 2002), 181-194.

Wood et al., Memory Buddies: Exploiting Page Sharing for Smart Colocation in Virtualized Data Centers, in Proceedings of the 2009 ACM SIGPLAN/SIGOPS International Conference on Virtual Execution Environments (New York, NY, USA, 2009), VEE'09, ACM, pp. 31-40.

Tolia et al., Opportunistic Use of Content Addressable Storage for Distributed File Systems, USENIX Annual Technical Conference 2003.

Quinlan et al., Venti: A New Approach to Archival Storage, USENIX FAST 2002.

\* cited by examiner

VIRTUAL MACHINE EXCLUSIVE CACHING

FIELD OF THE INVENTION

Embodiments of the invention generally relate to information technology, and, more particularly, to memory cache management.

BACKGROUND

Memory cache management is a prominent factor affecting a cloud computing system's performance. In an environment with high memory pressure, it is important to to eliminate duplicate pages in the host and guest caches. Existing cache de-duplication approaches, however, have high complicity and therefore are not widely applicable. Accordingly, a need exists to address the issue of wasting memory usage on storing identical data blocks.

SUMMARY

In one aspect of the present invention, techniques for virtual machine exclusive caching are provided. An exemplary computer-implemented method for caching in a virtualized computing environment can include steps of enforcing a host page cache on a host physical machine to store only base image data, and enforcing each of at least one guest page cache on a corresponding guest virtual machine to store only data generated by the guest virtual machine after the guest virtual machine is launched, wherein each guest virtual machine is implemented on the host physical machine.

Another aspect of the invention includes a system that includes a host physical machine having at least one computer file system, each system storing at least one virtual machine image, wherein the host physical machine uses a memory segment as a host cache and each virtual machine image contains at least one operating system and zero or more application programs; at least one virtual machine residing on the host physical machine, wherein each virtual machine has a virtual disk loaded from a virtual machine image and each virtual machine is assigned a memory segment from the host physical machine to be used as a guest cache for each virtual disk; and a partitioning engine that partitions the virtual disk content into two non-empty and non-overlapping subsets, wherein a first subset is to be cached in the guest cache and a second subset is to be cached in the host cache.

In another aspect of the invention, a system includes one or more base image templates stored on one or more host cache memories on one or more physical host computers connected by one or more networks, the networks being in a computer network environment; one or more virtual computer processes residing on the network environment, the virtual computer processes having access to one or more guest cache memories on one or more virtual machines residing on the physical host computers, the guest cache memories having one or more private data images that are specific to one or more of the virtual computer processes; a control module that monitors the starting of one or more of the virtual computer processes, the control module loading and executing one or more of the base image templates from one or more of the host memories to one or more of the virtual computer processes upon startup; and a redirection module that reads one or more data requests and determines whether to direct the request to one or more of the host cache memories or one or more of the guest cache memories.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps. Yet further, another aspect of the invention or elements thereof can be implemented in the form of means for carrying out the method steps described herein, or elements thereof; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
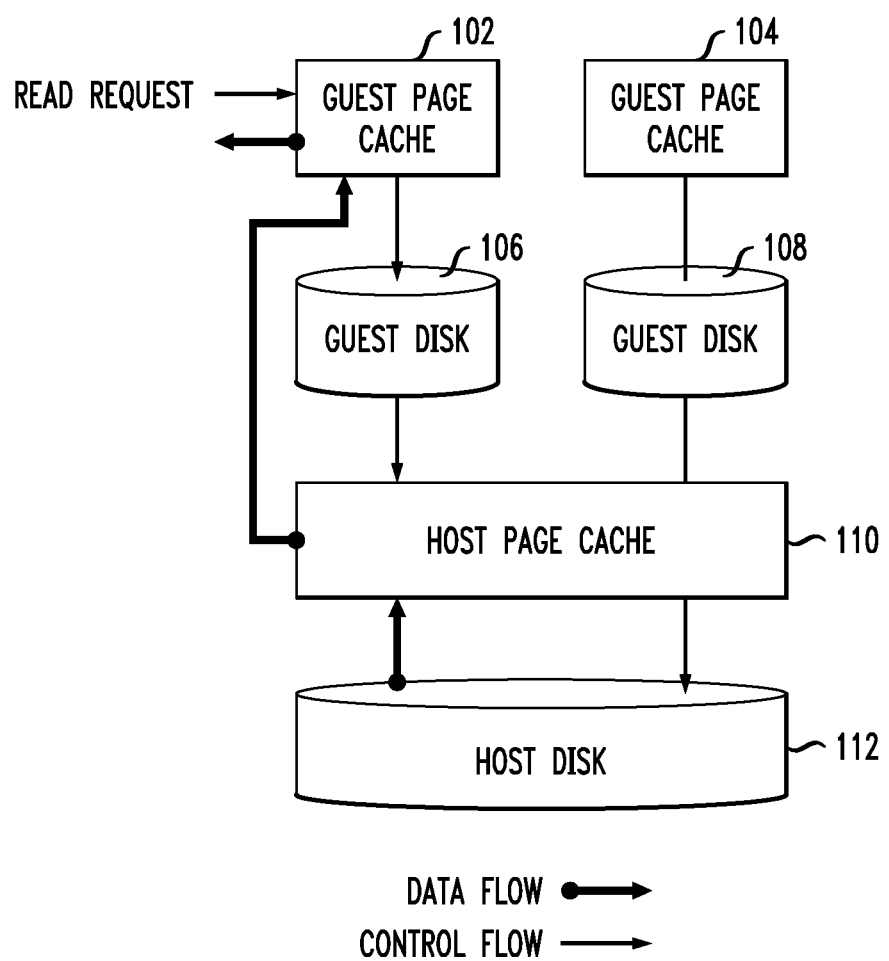
FIG. 1 is a diagram illustrating control and data flows of a data read request, according to an embodiment of the present invention.

As described herein, an aspect of the present invention includes virtual machine (VM) exclusive caching. At least one embodiment of the invention includes providing a caching mechanism based on functional partitioning. In the mechanism, the VM host caches data in base images, and each individual VM guest caches its own "private data" which is generated after it launches. Accordingly, both the host and each guest can determine whether to cache a block of data without any additional information exchange.

Descriptions of example embodiments of the invention herein include the use of the terms base image data and private data. In cloud offerings, each virtual machine is started from a base image from the image catalog provided by a cloud manager. This image includes, for example, the operating system, the DB2 software, and some basic packages installed. A user can select this base image, launch a virtual machine, and start using the DB2. When the user starts populating the DB2 database, the newly populated data belongs to the private data. In other words, by way of example, a base image is akin to a template of many virtual machines, while the private data is each virtual machine's variance from the template.

On the host, it can be determined which part of a block of data belongs to base image data versus private data. For example, when a virtual machine starts from scratch, the base image data constitutes 100% and private data constitutes 0%. When a block of data is modified, it is marked by the host as private data, and marked as no longer belonging to base image data. On the guest, the modification time of the block is examined. If the modification time is later than the virtual machine boot time, then the data is private data. Otherwise, the data is base image data. At least one embodiment of the invention includes approximating this by checking the modification time of the file to which the data block belongs.

As will be detailed herein, on the guest, when a read request is for a block of data in the base image data part of the block, the request is directly sent to the host cache. Therefore, the data has no chance of entering the guest cache. On the host, there is a file storing all private data, and the host can open this file using a direct input/output (I/O) mode. In such a mode, all read requests bypass the host cache and directly go to the disk. Therefore, private data has no chance to enter the host cache.

Additionally, at least one embodiment of the invention includes a patch to a Linux operating system kernel to enforce the kernel to avoid keeping clean data pages in the cache. Further, such an embodiment can also include a patch to the virtualization driver which enforces the kernel to keep data blocks in VM images only.

As noted, aspects of the invention include dividing information into base and private portions, caching the base information at the hardware level, and caching the private information across layers of VMs. Also, at least one embodiment of the invention can be used for any network caching as well as in cloud environments.

FIG. 1 is a diagram illustrating control and data flows of a data read request, according to an embodiment of the present invention. By way of illustration, FIG. 1 depicts guest page caches 102 and 104, guest disks 106 and 108, a host page cache 110 and a host disk 112.

Accordingly, in a virtualized environment, a read request for a block of data goes through multiple software layers. FIG. 1 demonstrates the control and data flows when a read request arrives. For simplicity of discussion, assume that the guest and host file-systems use the same block size as a memory page (for example, 4 KB), and the request is for a single block of data. As noted, dotted arrow lines denote the control flow in FIG. 1. As such, the read request is checked against the guest page cache (102). If the request is a miss in the guest page cache, the request is forwarded to the guest disk (106), and a new page is allocated in the page cache as the buffer for this request. The request to the guest disk is translated by the input/output (I/O) virtualization layer to a host-level read request to the image file. This read request is checked against the host page cache 110, and is forwarded to the host disk 112 in case of a miss.

Solid arrow lines denote the data flow in FIG. 1. When the block of data is prepared ready by the host disk 112, it will be transferred via direct memory access (DMA) to the host page cache 110. Then, the I/O virtualization layer will trigger a memory transfer from the host page cache 110 to the guest page cache (106), and the data is ultimately returned to the calling application. Some cloud systems store VM images on storage servers that are remotely connected to VM hosts running the hypervisor. In such environments, interactions between the host page cache and the host disk involve the remote storage server.

Performance of the data read request depends on whether and where it gets a cache hit. If a request is a hit in the guest cache, the latency contains one memory copy from the guest cache to the application space. If a request is a miss in the guest cache and a hit in the host cache, the latency contains two memory copies: one from the host cache to the guest cache, and one from the guest cache to the application space. If a request is a miss in both caches, the latency contains two memory copies and one disk transfer.

Additionally, there can be other factors affecting the I/O performance. For example, the current Linux kernel adopts an aggressive pre-fetching policy. For both cache hits and cache misses, several blocks after the requested block will be appended to the request. Additionally, each guest cache miss generates a system call to the host operating system (OS), which causes an additional context switch. Also, guest memory is often faster than host memory, and host memory is often faster than host disk.

Both the host cache and the guest cache can be configured to be ON or OFF in a storage hierarchy such as described above. At least one embodiment of the invention can also include different guest/host cache configurations. One such configuration is: host cache=ON, guest cache=ON. This configuration can cause data blocks to be cached on both the guest and the host levels. When memory is abundant, this increases the chance that a block of data is cached in memory. When memory resource is scarce, this causes performance degradation due to wasted cache space to store duplicate data. Moreover, the overall pre-fetching may become too aggressive because the guest cache appends several blocks to a read request even if it is purely random. This gives the host cache incorrect confirmation and causes it to increase the pre-fetching depth.

Another configuration is: host cache=OFF, guest cache=ON. This configuration aligns with an understanding that each guest has the most accurate knowledge about its I/O pattern, and is therefore the most logical element to determine what pages keep. However, this configuration completely eliminates opportunities for content-aware sharing. Yet another configuration is: host cache=ON, guest cache=OFF. When the host is fully responsible for I/O caching, guests can potentially require less memory. This way, there are rich opportunities for the host to adopt intelligent memory management mechanisms. This configuration saves the total amount of used memory because all cached data blocks can be de-duplicated with content-aware techniques. However, this configuration indicates no guest memory access at all, which can create high context switch overhead.

Also, another configuration is: host cache=OFF, guest cache=OFF. With this configuration, all I/O requests disadvantageously go directly to the disk, and the system will suffer from heavy I/O load. As such, the two configurations with guest cache=ON are used in production cloud platforms. They are advantageous over each other depending on the resource availability of the host machine.

As detailed herein, at least one embodiment of the invention includes a mechanism that can be implemented for general purpose virtualization environments and need not be limited to workload-specific optimizations.

A challenge in achieving caching exclusiveness is frequent information exchange. For example, in client-server architecture, if a server wants to only cache data blocks that are not present in the client cache, the client needs to inform the server of every cache eviction. Given the high frequency of cache operations, this can cause high overhead.

An example technique to avoid communication overhead is functional partitioning (FP). Similar to distributed hash tables (DHT) used in peer-to-peer systems, FP avoids frequent bookkeeping by setting up rules for each component to understand its own portion of tasks or data. Moreover, in contrast to random distribution rules used in DHT, rules in FP consider the different characteristics of tasks and components. One example includes the mitigation of operating system (OS) jitter by aggregating system tasks to dedicated cores in multicore systems.

At least one embodiment of the invention includes adopting the functional partitioning principle and designating guest and host caches to store different portions of the VM disk data. In some example embodiments, the host cache can use more space storing clean base image data, and accordingly, the base image data in the host page cache can be shared among all guests. Also, a guest's cache space can be dedicated to its own private data. Because the likelihood of two individual VM guests generating identical private data pages is low, those pages can be kept in the guest memory for faster access. Keeping private data within individual VM boundaries also enhances performance isolation by preventing one guest from generating a large amount of data and polluting the shared host cache.

Figure 2:
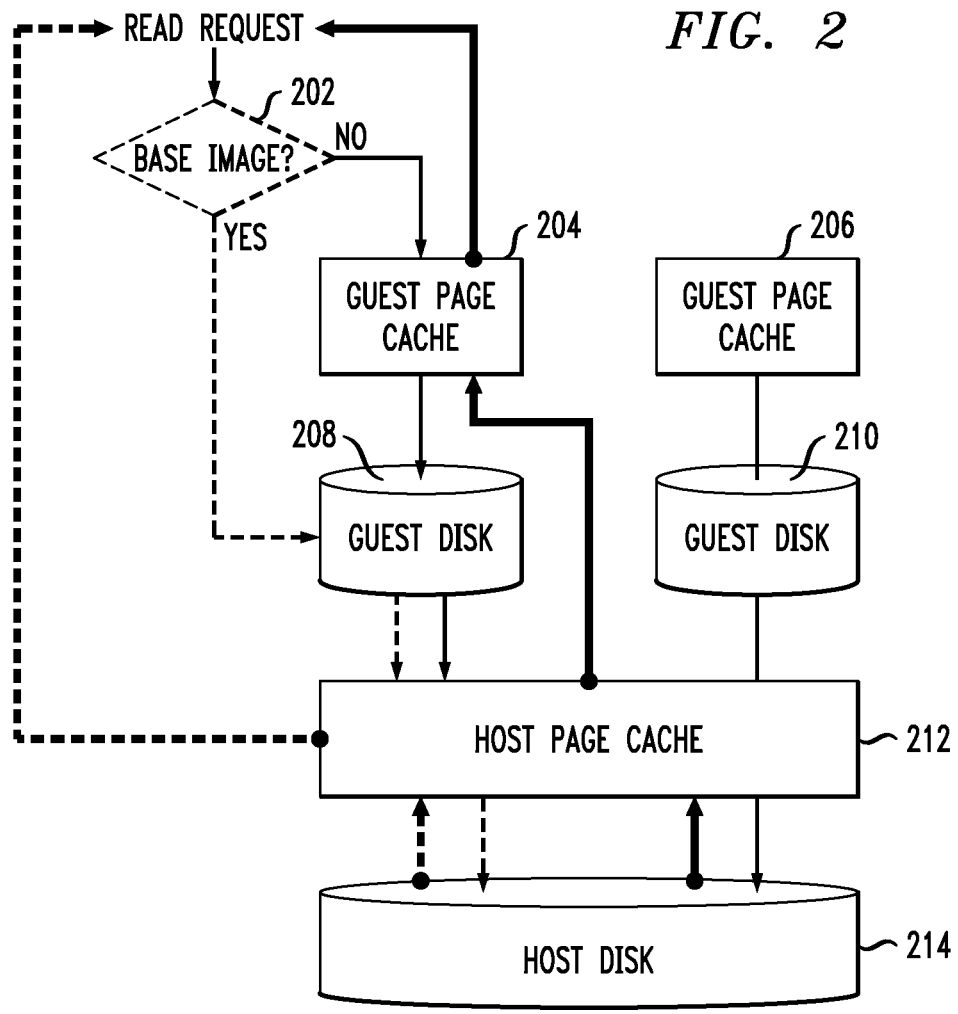
FIG. 2 is a diagram illustrating an example input/output flow, according to an embodiment of the present invention.

FIG. 2 is a diagram illustrating an example input/output flow, according to an embodiment of the present invention. By way of illustration, FIG. 2 depicts a base image 202, guest page caches 204 and 206, guest disks 208 and 210, a host page cache 212 and a host disk 214.

Challenges exist in enforcing a guest to cache only its private data. For example, on the guest level, it is not easy to determine whether a block belongs to private data or base image. As depicted in FIG. 2, at least one embodiment of the invention includes making such a determination in step 202. This can include checking the modification time (m time) of the file containing the block of data. If the file has been modified after the guest system launch time boot time, the block is considered private data and the access path detailed in FIG. 1 is followed.

When a read request is categorized into base image data, at least one embodiment of the invention includes attempting to avoid storing it in the guest cache. An example technique is based on direct I/O. For each guest-level file belonging to the base image, an attempt is made to follow the data access path of the 0 DIRECT system flag. For example, in Linux, when a file is opened in normal mode (without 0 DIRECT), the data access path is as illustrated in FIG. 1. If the 0 DIRECT flag is used, all read and write requests to this file will bypass the page cache. When a read request for a piece of data arrives, it is not checked against the cache. Instead, a direct I/O request is sent to the disk (208), and the memory buffer provided by the calling application is used as the destination of the DMA transfer.

In accordance with at least one embodiment of the invention, when the O_DIRECT flag is used in opening a file, all data requests to that file will be served by directly sending block I/O requests to the hard disk. If the O_DIRECT flag is not used in opening a file, all data requests to that file will be checked against the file system cache first. If the requested data is not available in the cache, a memory page will be created in the cache, and a block I/O request will be sent to the disk, using the cache memory page as the transfer destination.

As illustrated in FIG. 2, if a file is opened with 0 DIRECT on the guest level, the application buffer is directly used to receive data transferred from the host. Assuming the host-level file containing the data is opened without 0 DIRECT, the request is checked against the host cache 212. If the data is found the host cache, it is memory-copied to the guest application buffer. Otherwise, a page is created in the host cache 212 as the receiving buffer from the host disk 214. The data is then transferred via DMA from the host disk 214 to the host cache 212 and copied to the guest application buffer. Accordingly, the guest cache (204) space can be saved from storing base image data, and no additional memory copy is needed to get the data from the host side.

Additionally, in at least one embodiment of the invention, data transfers from the disk file-system are in the unit of file-system blocks, and the request's file offset is to align with the file-system block size. Also, in such instances, the buffer provided by the request also needs to align with the file-system block size. This alignment is expected by some device drivers when they perform DMA.

Enforcing the host to cache only base image data can be carried out, for example, by opening the copy-on-write file with the O DIRECT flag and the base image file in normal mode. By way of example, when a quick emulator (QEMU) copy-on-write file is opened, the base image file that serves as its "backing file" is opened with the same caching flag. An aspect of the invention includes modifying the QEMU driver so that the copy-on-write file does not pass the O DIRECT flag to its base file.

Additionally, as detailed herein, there can be high content similarity among VM images. The compression ratio is defined as:

$$1 - \frac{|\text{Unique chunks}|}{|\text{Total (non-zero) chunks}|}.$$

This indicates the percentage of space that can be saved by dividing all VM images into chunks and combining chunks with identical content. Various well-known content-aware storage de-duplication techniques can be used to achieve this saving. Once the storage layer has compressed the images, the host cache, which resides in the virtual file system (VFS) layer above all concrete storage systems, can naturally cache de-duplicated image data. Because the de-duplication of image data can be done at the repository when new images are checked in, it imposes very small overhead to running VMs.

As described herein, when the guest or host memory is abundant, a naive policy can be used where the cache keeps all data blocks it processes. Therefore, at least one embodiment of the invention includes adaptive triggers to bypass the functional partitioning and cache as much data as possible.

On the guest side, a cloud can provide to customers VM images with different caching policies. For example, if a customer wants "more than enough" memory to guarantee good performance, an image with the unmodified OS caching policy can be chosen. For customers who prefer smaller and cheaper VM types at the cost of slightly degraded I/O performance, an image with the direct I/O scheme can be used.

On the host side, the system administrator can decide when to enable and disable the policy to cache base image data only. This decision can be based, for example, on the amount of free memory.

Figure 3:
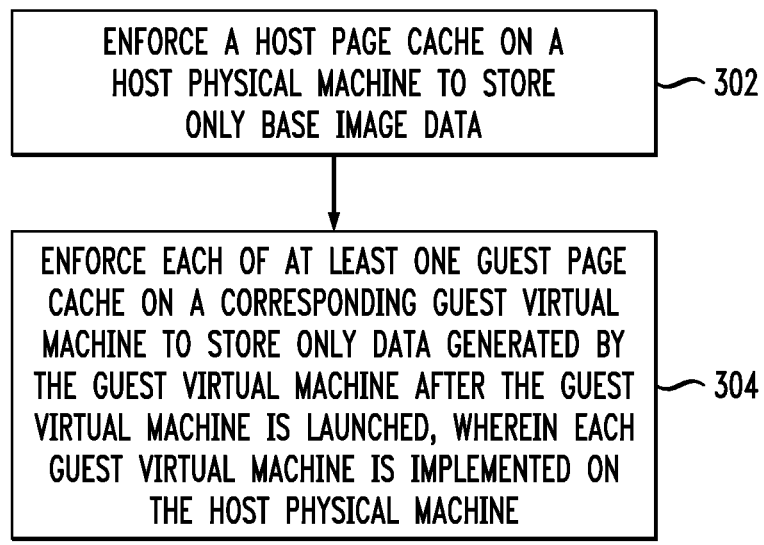
FIG. 3 is a flow diagram illustrating techniques for caching in a virtualized computing environment, according to an embodiment of the invention.

FIG. 3 is a flow diagram illustrating techniques for caching in a virtualized computing environment, according to an embodiment of the present invention. Step 302 includes enforcing a host page cache on a host physical machine to store only base image data. Step 304 includes enforcing each of at least one guest page cache on a corresponding guest virtual machine to store only data generated by the guest virtual machine after the guest virtual machine is launched (also referred to herein as private data), wherein each guest virtual machine is implemented on the host physical machine.

The techniques depicted in FIG. 3 can also include serving a read request from the guest page cache if the read request is for data generated by the guest virtual machine after the guest virtual machine is launched. Additionally, at least one embodiment of the invention can include serving a read request directly from the host page cache if the read request is for base image data.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then to be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

Additionally, as described herein, at least one embodiment of the invention can include a caching system for a virtualized computing environment. Such a system includes a host physical machine having at least one computer file system, each system storing at least one virtual machine image, wherein the host physical machine uses a memory segment as a host cache and each virtual machine image contains at least one operating system and zero or more application programs. Also, such a system includes at least one virtual machine residing on the host physical machine, wherein each virtual machine has a virtual disk loaded from a virtual machine image and each virtual machine is assigned a memory segment from the host physical machine to be used as a guest cache for each virtual disk.

Further, such a system includes a partitioning engine that partitions the virtual disk content into two non-empty and non-overlapping subsets, wherein a first subset is to be cached in the guest cache and a second subset is to be cached in the host cache. The first subset contains all data blocks that have been modified or added to the virtual disk after the virtual machine starts. Also, the second subset contains the rest of the data blocks on the virtual disk.

An embodiment of the invention can also include user processes running within each virtual machine, wherein each user process issues one or more data requests to the virtual disk of the virtual machine. Additionally, a system such as described above can also include an adaptive monitoring engine that disables the partitioning engine and enlarges both the first and the second subset to be equal to the entire virtual disk when the amount of free memory in the system is above a predefined threshold. In at least one embodiment of the invention, the owner/administrator of the computer system defines the threshold before the system is started. The caching framework detailed herein can also provide an interface for the administrator to specify the threshold value. The exact value for each computer system depends on the empirical judgment of the administrator of the workload.

As also described herein, at least one embodiment of the invention includes a virtual computer caching system that includes one or more base image templates stored on one or more host cache memories on one or more physical host computers connected by one or more networks, the networks being in a computer network environment. Such a system also includes one or more virtual computer processes residing on the computer network environment, the virtual computer processes having access to one or more guest cache memories on one or more virtual machines residing on the one or more physical host computers, the guest cache memories having one or more private data images that are specific to one or more of the virtual computer processes.

Additionally, such a system further includes a control module that monitors the starting of one or more of the virtual computer processes, the control module loading and executing one or more of the base image templates from one or more of the host memories to one or more of the virtual computer processes upon startup, and a redirection module that reads one or more data requests and determines whether to direct the request to one or more of the host cache memories or one or more of the guest cache memories. The redirection module directs the data request to one or more of the host cache memories that provides a base image data set to the respective virtual computer process if the data request is requesting one or more of the base image templates. Also, the redirection module directs the request to one or more of the guest cache memories that provides a private data set to the respective virtual computer process if the data request is requesting one or more of the private data images.

In such an embodiment of the invention, the base image templates include one or more operating systems, one or more database programs, and one or more base data sets. Also, one or more of the guest cache memories reside on one or more disk memories on one or more of the host computers, and one or more of the base image templates reside on a dynamic memory storage within one or more of the host computers.

Additionally, in at least one embodiment of the invention, the base image templates and the private data images reside on separate memories, and the one or more memories storing the base image templates are in a cache hierarchy. Further, in such an embodiment, the guest cache memories are in a cache hierarchy.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Figure 4:
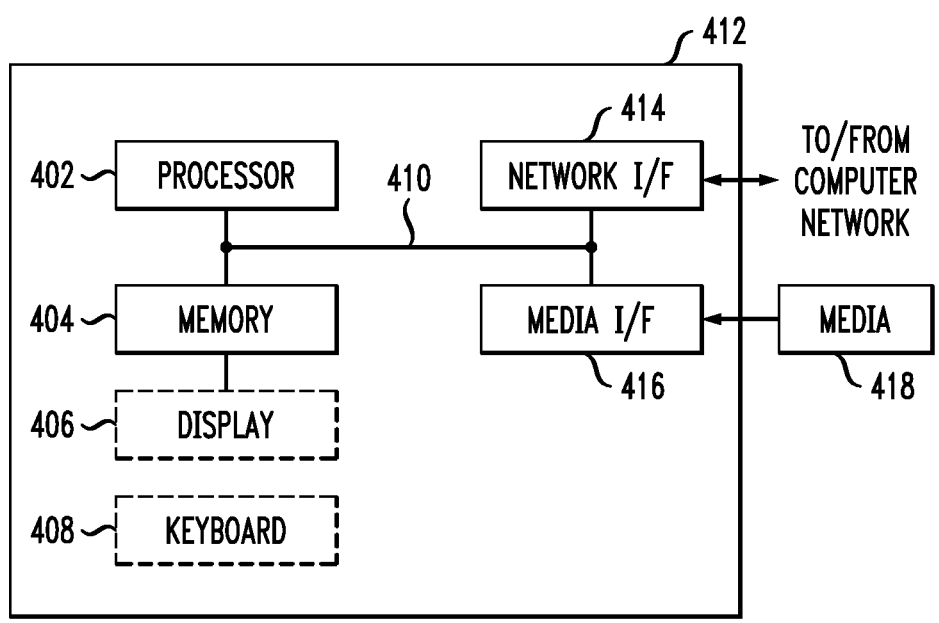
FIG. 4 is a system diagram of an exemplary computer system on which at least one embodiment of the invention can be implemented.

Additionally, an aspect of the present invention can make use of software running on a general purpose computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software can include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed. Also, at least one aspect of the present invention may provide a beneficial effect such as, for example, enabling both the host and each guest to determine whether to cache a block of data without any additional information exchange.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for caching in a virtualized computing environment, the method comprising:
    dividing multiple items of data within the virtualized computing environment into (i) one or more items of base image data and (ii) one or more items of private data, wherein base image data comprise data related to a template applicable to a set of virtual machines and wherein private data comprise data generated by a virtual machine in the set of virtual machines that is a variance from the template;
    caching said one or more items of base image data exclusively on a host page cache on a host physical machine; and
    caching said one or more items of private data, generated by a guest virtual machine after the guest virtual machine is launched, exclusively on a guest page cache on the guest virtual machine, wherein each guest virtual machine is implemented on the host physical machine.

2. The method of claim 1, comprising serving a read request from the guest page cache if the read request is for data generated by the guest virtual machine after the guest virtual machine is launched.

3. The method of claim 1, comprising serving a read request directly from the host page cache if the read request is for base image data.

4. An article of manufacture comprising a computer readable storage medium having computer readable instructions tangibly embodied thereon which, when implemented, cause a computer to carry out a plurality of method steps comprising:
    dividing multiple items of data within the virtualized computing environment into (i) one or more items of base image data and (ii) one or more items of private data, wherein base image data comprise data related to a template applicable to a set of virtual machines and wherein private data comprise data generated by a virtual machine in the set of virtual machines that is a variance from the template;
    caching said one or more items of base image data exclusively on a host page cache on a host physical machine; and
    caching said one or more items of private data, generated by a guest virtual machine after the guest virtual machine is launched, exclusively on a guest page cache on the guest virtual machine, wherein each guest virtual machine is implemented on the host physical machine.

5. The article of manufacture of claim 4, wherein the method steps comprise serving a read request from the guest page cache if the read request is for data generated by the guest virtual machine after the guest virtual machine is launched.

6. The article of manufacture of claim 4, wherein the method steps comprise serving a read request directly from the host page cache if the read request is for base image data.

7. A caching system for a virtualized computing environment, the caching system comprising:
a host physical machine having at least one computer file system, each computer file system storing at least one virtual machine image, wherein the host physical machine uses a memory segment as a host cache and each virtual machine image contains at least one operating system and zero or more application programs;
at least one virtual machine residing on the host physical machine, wherein each virtual machine has a corresponding virtual disk loaded from a virtual machine image and each virtual machine is assigned a memory segment from the host physical machine to be used as a guest cache for the corresponding virtual disk; and
a partitioning engine that partitions content of each corresponding virtual disk into two non-empty and non-overlapping subsets comprising (i) one or more items of base image data and (ii) one or more items of private data, wherein base image data comprise data related to a template applicable to a set of virtual machines and private data comprise data generated by a virtual machine in the set of virtual machines that is a variance from the template, and wherein the one or more items of private data are to be cached exclusively in the guest cache and the one or more items of base image data are to be cached exclusively in the host cache.

8. The caching system of claim 7, comprising one or more user processes running within each virtual machine, wherein each user process issues one or more data requests to the corresponding virtual disk of each virtual machine.

9. The caching system of claim 7, wherein the one or more items of private data contain all data blocks that have been modified or added to each corresponding virtual disk after the at least one virtual machine starts.

10. The caching system of claim 9, wherein the one or more items of base image data contain remaining data blocks on each corresponding virtual disk.

11. The caching system of claim 7, comprising an adaptive monitoring engine which disables the partitioning engine and enlarges both subsets to be equal to each corresponding virtual disk when an amount of free memory in the caching system is above a predefined threshold.

12. A virtual computer caching system comprising:
a partitioning engine that partitions data from a computer network environment into (i) one or more base image templates and (ii) one or more private data images, wherein base image templates comprise data applicable to a set of virtual machines and private data images comprise data generated by a virtual machine in the set of virtual machines that is a variance from the one or more base image templates;
the one or more base image templates cached exclusively on one or more host cache memories on one or more physical host computers connected by one or more networks, the networks being in the computer network environment;
one or more virtual computer processes residing on the computer network environment, the virtual computer processes having access to one or more guest cache memories on one or more virtual machines residing on the one or more physical host computers, the one or more private data images cached exclusively on the one or more guest cache memories;
a control module that monitors starting of one or more of the virtual computer processes, the control module loading and executing one or more of the base image templates from one or more of the host memories to one or more of the virtual computer processes upon startup; and
a redirection module that reads one or more data requests and determines whether to direct the one or more data requests to one or more of the host cache memories or one or more of the guest cache memories.

13. The virtual computer caching system of claim 12, wherein the base image templates comprise one or more operating systems, one or more database programs, and one or more base data sets.

14. The virtual computer caching system of claim 12, wherein the redirection module directs the one or more data requests to one or more of the host cache memories that provides a base image data set to the one or more virtual computer processes if the one or more data requests are requesting one or more of the base image templates.

15. The virtual computer caching system of claim 12, wherein the redirection module directs the one or more data requests to one or more of the guest cache memories that provides a private data set to the one or more virtual computer processes if the one or more data requests request one or more of the private data images.

16. The virtual computer caching system of claim 12, wherein one or more of the guest cache memories reside on one or more disk memories on one or more of the host computers.

17. The virtual computer caching system of claim 12, wherein one or more of the base image templates reside on a dynamic memory storage within one or more of the host computers.

18. The virtual computer caching system of claim 12, wherein the base image templates and the private data images reside on separate memories.

19. The virtual computer caching system of claim 12, wherein the guest cache memories are in a cache hierarchy.

20. The virtual computer caching system of claim 12, wherein the one or more host cache memories storing the base image templates are in a cache hierarchy.

* * * * *